United States Patent [19]

Gladnick

[11] 3,837,509

[45] Sept. 24, 1974

[54] BOAT ALIGNMENT APPARATUS FOR ATTACHMENT TO BOAT TRAILER

[75] Inventor: Ronald C. Gladnick, Smithtown, N.Y.

[73] Assignee: Compass Holding Corporation, New York, N.Y.

[22] Filed: Nov. 8, 1972

[21] Appl. No.: 304,618

[52] U.S. Cl. .............................. 214/84, 280/414 R
[51] Int. Cl. .............................................. B60p 1/46
[58] Field of Search .......... 214/84, 505, 506, 1 CM; 280/414 R

[56] References Cited
UNITED STATES PATENTS
3,021,969  2/1962  Peake et al. ........................... 214/84
3,066,805  12/1962  Sullivan ............................. 214/1 CM
3,204,790  9/1965  Collins ................................. 214/84

Primary Examiner—Albert J. Makay
Assistant Examiner—Kenneth Noland
Attorney, Agent, or Firm—DeLio and Montgomery

[57] ABSTRACT

Apparatus attachable in pairs to rear portions of a boat trailer for guiding a boat onto or off the trailer, wherein the apparatus comprises an elongated rigid first member attachable to the chassis of the trailer; an elongated rigid second member coupled to the first member transversely thereof and pivotable about the longitudinal axis of the first member; an arm-like third member coupled to the second member generally transversely thereof and pivotable about the longitudinal axis of the second member; and means for locking the members at predetermined positions relative to one another.

13 Claims, 11 Drawing Figures

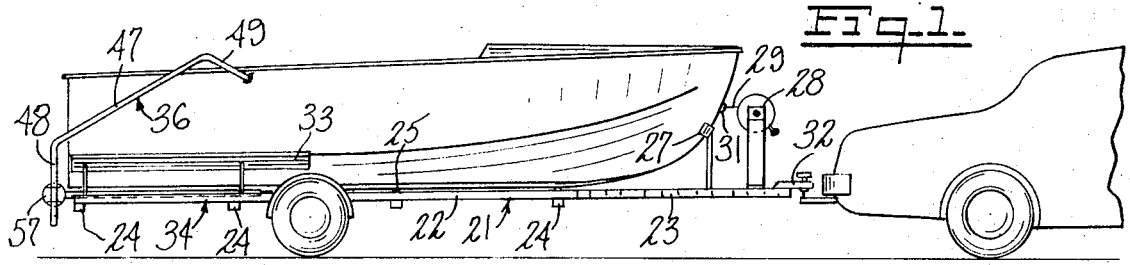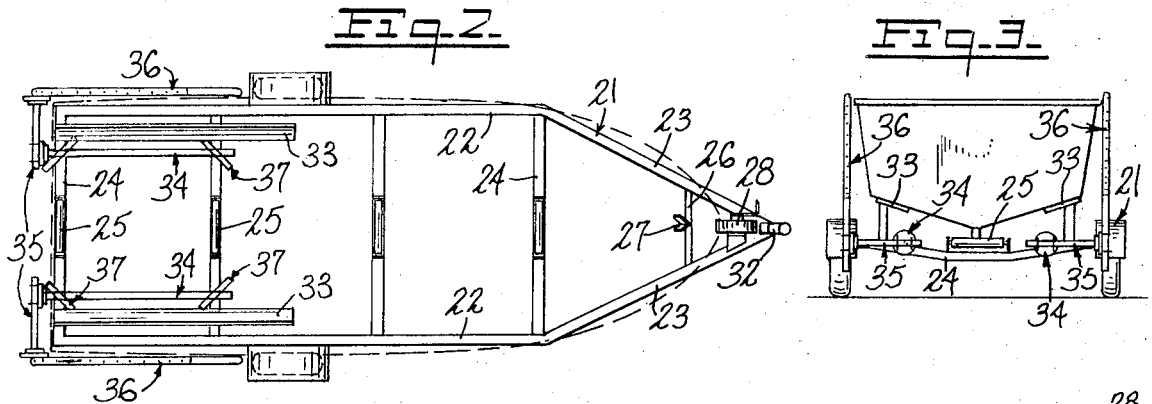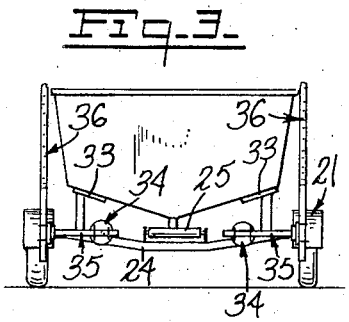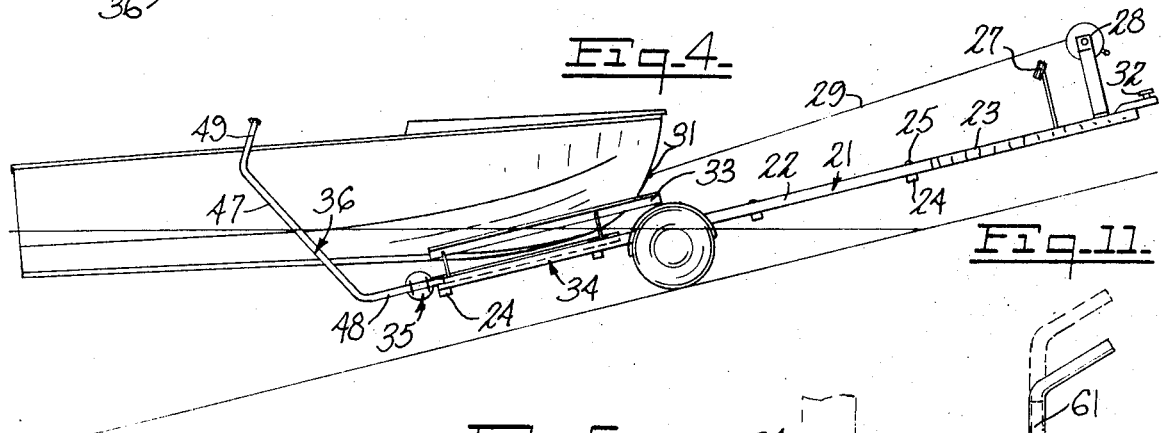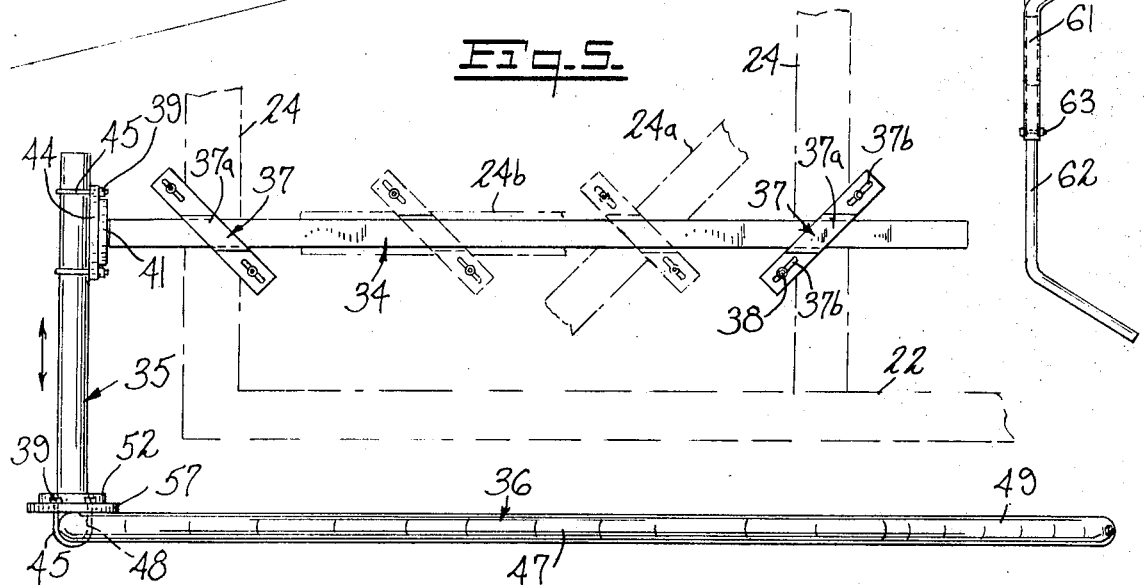

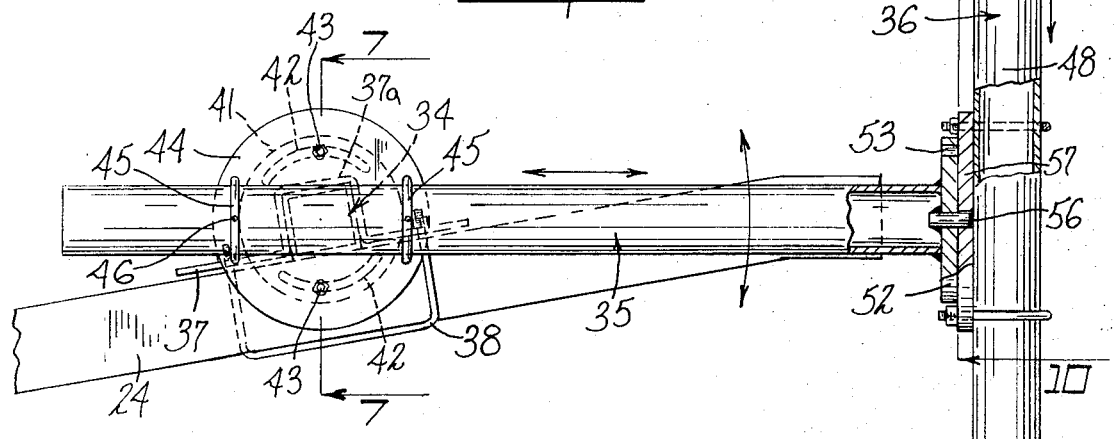
Fig. 6.
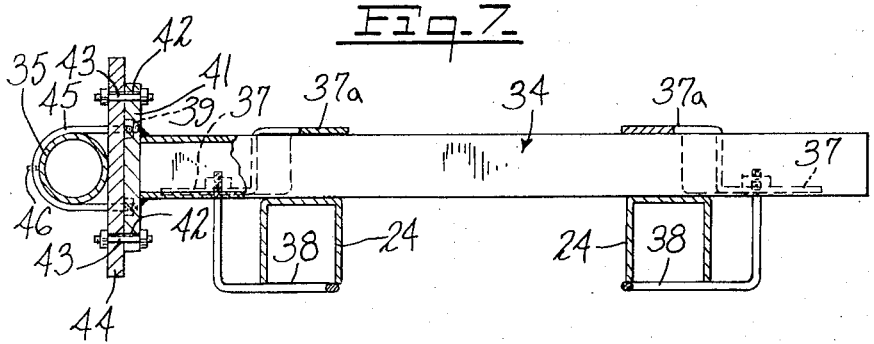
Fig. 7.
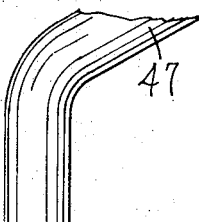
Fig. 8.
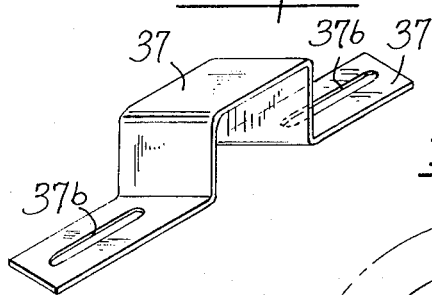
Fig. 9.
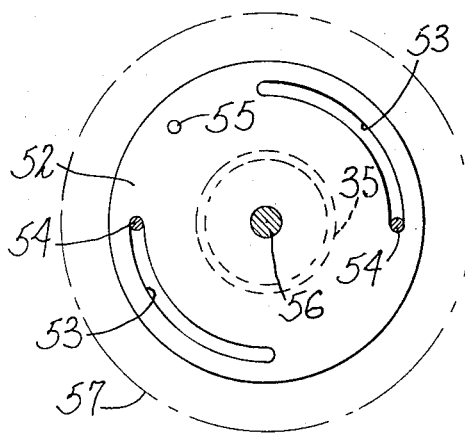
Fig. 10.
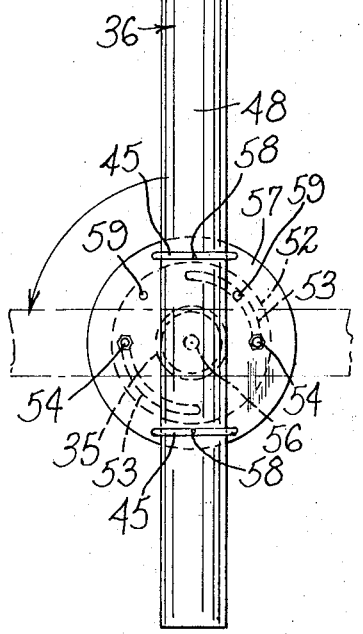

BOAT ALIGNMENT APPARATUS FOR ATTACHMENT TO BOAT TRAILER

BACKGROUND OF THE INVENTION

This application relates to apparatus which can be adjustably attached to a boat trailer for guiding a boat onto or off the trailer, and to boat trailers incorporating such apparatus.

Every boatsman or sailor is familiar with the problem of guiding his boat onto or off a trailer. The difficulties are especially acute when loading a boat onto a trailer. Under ideal conditions, the trailer is backed down a ramp so that its rear section is below the surface of the water. The bow of the boat is then guided over the submerged section of the trailer in alignment with the trailer bed, and the boat is powered or hauled onto the bed of the trailer, frequently by means of a winch and line attached to a bow eye on the boat. Extreme care must be taken during this operation to avoid damaging the boat by misalignment with the trailer chassis.

Normally, it is not possible for a single operator to load the boat onto the trailer. Most often, several operators cooperate in the aligning and loading operation so that the chances of damage to the boat are minimized. For example, one person will stand in the water aligning the boat to the trailer, and a second person will operate a winch to draw the boat onto the trailer.

Due to the rapid increase in the number of small pleasure craft in recent years, and limited ramp facilities, considerable attention has been given to trailer modifications to eliminate or to minimize the problems associated with loading or launching a boat. The modifications take many forms, including wheeled dolleys which ride on tracks longitudinal of the trailer chassis, powered lines, and the like. However, the complete redesign of boat trailers to overcome the aforementioned problems tends to be expensive, and many of the designs are not adaptable to trailers for carrying boats of different shapes and sizes.

An evident need, therefore, is a simple and inexpensive device or apparatus which is attachable to virtually any of the many designs of boat trailers. At the same time, the device or apparatus should be adjustable so that the same trailer can be used with boats of different hull designs and widths. This requirement applies to most trailers since the trailer manufacturer never knows what type of boat hull the trailer will be carrying unless a trailer is designed for a specific hull.

OBJECTS AND SUMMARY

Accordingly, an object of the invention is to provide new and improved apparatus adjustably attachable to virtually any boat trailer so as to adapt the trailer for guiding a boat onto or off the trailer.

Another object is to provide new and improved apparatus for attachment in pairs to a boat trailer for alignment of a boat when loading the boat onto the trailer, without damage to the boat by contact with the trailer.

Still another object of the invention is to provide new and improved apparatus for attachment to a boat trailer whereby the trailer is adapted for one man loading of a boat onto the trailer.

These and other objects, features and advantages of the invention will be apparent from the specification which follows.

In summary outline, the foregoing and other objects are achieved by apparatus which comprises an elongated rigid first member attachable to the chassis of the trailer; an elongated rigid second member coupled to the first member transversely thereof and pivotable about the longitudinal axis of the first member; an arm-like third member coupled to the second member generally transversely thereof and pivotable about the longitudinal axis of the second member; and means for locking the members at predetermined positions relative to one another.

In preferred embodiments, the three members of the apparatus are connected by two pairs of plates wherein the plates in each pair are rotatably engaged. By suitable slots and locking means associated with the plates, the three members may be pivoted relative to one another so that boats of different widths and hull designs may be accommodated, and so that the arm-like member may be folded away when not in use for alignment of the boat with a trailer.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is had to the following description taken in conjunction with the accompanying drawings, in which:

FIG. 1 is a partly schematic elevational side view of a boat and trailer embodying apparatus of the invention;

FIG. 2 is a partially diagrammatic, top plan view of the boat and trailer portion of FIG. 1;

FIG. 3 is an elevational rear end view of a trailer incorporating apparatus of the invention, taken from the left side of the view of FIG. 2;

FIG. 4 is an elevational side view of a trailer incorporating apparatus of the invention during a boat loading operation;

FIG. 5 is a top plan view of apparatus of the invention, together with diagrammatic views of alternate relationships to portions of a trailer chassis;

FIG. 6 is an elevational rear end view of apparatus of the invention on a portion of a trailer chassis, with portions broken away to indicate underlying structure;

FIG. 7 is a vertical section along the line 7—7 of FIG. 6;

FIG. 8 is a partially diagrammatic, enlarged, elevational side view of a portion of apparatus of the invention;

FIG. 9 is a partially diagrammatic, perspective view of a clamp portion of apparatus of the invention;

FIG. 10 is a vertical section along the line 10—10 of FIG. 6; and

FIG. 11 is a partially diagrammatic, plan view of an alternate embodiment of a portion of apparatus of the invention.

With reference to FIGS. 1–10, a typical boat trailer chassis 21 includes a framework of parallel longitudinal rails 22 closed at the forward end with a pair of angled rails 23. A plurality of cross rails 24 define a V-shaped bed to receive the bottom of a boat, Rollers 25 usually are mounted on the cross rails 24 for rolling contact with the keel of the boat. A forward cross member 26 of the chassis carries a stop member 27 for abutment with the bow of the boat. A winch 28 is mounted on the forward end of the chassis for control of a cable 29 which conventionally attaches to a bow eye 31 of the boat, to facilitate hauling or releasing the boat relative to the trailer. A hitch 32 mounted on the forward end of the trailer connects the trailer to a vehicle. A pair of elevated supports such as platforms 33 are mounted on the rear portion of the trailer chassis to cradle the stern of the boat.

Also with reference to FIGS. 1–10, in one embodiment of apparatus of the invention, an elongated rigid member such as a hollow square support beam 34 is anchored to the chassis of the trailer longitudinally thereof, over two or more of the cross rails 24 (or along or on top of rails 22 if desired) by clamps to be described. Transversely connected to rail 34 by a coupling mechanism to be described, is a second elongated rigid member such as tubular member 35. Connected transversely of the other end of member 35 is an arm-like leg member such as the angled tubular member 36.

The anchoring beam 34 is adjustably mounted across rails 24 of the trailer chassis by riser clamps 37. The riser portion 37a of the clamps, as evident particularly in FIG. 9, is angled approximately 45° relative to the tabular ends of the clamp so as to fit across beam 34 and cross member 24 at approximately 45°. The angled construction of the riser clamps renders them adaptable to use with different trailer chassis members, for example a chassis wherein the cross rails are in directions other than strictly 90° relative to the longitudinal axis of the chassis. Such construction is depicted diagrammatically in FIG. 5 wherein a riser clamp 37 is shown mounted over a rail 24a which is angled approximately 45° relative to longitudinal rail 22. FIG. 5 also illustrates the use of riser clamps with a trailer chassis wherein the primary boat supporting member is a single longitudinal rail 24b. This latter application of apparatus of the invention is described further below.

In any application of the riser clamps 37, a U-bolt 38 connects the clamp to a rail of the trailer chassis. The U-bolt preferably has a square riser configuration so as to fit a rectangular rail 24, 24a, or 24b. However, rounded U-bolts can be employed should rails of the chassis be tubular. The ends of the U-bolt 38 pass through elongated slots 37b in the riser clamp 37, the slots thus permitting adjustment of the U-bolts to accommodate chassis rails of different widths.

The members 34, 35 and 36 are coupled together such that member 35 can pivot about the longitudinal axis of member 34 and member 36 can pivot about the longitudinal axis of member 35, as indicated by the arrows of FIGS. 6 and 8. Members, 34, 35 and 36 are also adjustable transversely of each other by adjustment of U-bolts connecting the members to one another, in a manner to be explained. As evident particularly from FIGS. 2 and 3, this makes the apparatus adjustable to accommodate boats of different widths, and enables the apparatus to be adjusted to suit trailers of different designs, such as a trailer chassis having a curved cross member 24 forming the bed of the trailer, a chassis having a flat cross member, or a chassis having only longitudinal rails.

In one embodiment of pivotable connecting means, the members 34, 35 and 36 are coupled by two pairs of plates, as shown in detail in FIGS. 6, 7, 8 and 10. One plate 41 is rigidly mounted across the end of member 34 as by welding. A pair of slots 42 (FIG. 6) is provided on the periphery of plate 41 to receive lock bolts 43, so that plate 41 may be rotatably adjusted and then locked in coplanar face-to-face contact with a second plate 44. Plate 44 is affixed longitudinally of member 35 by a pair of U-bolts 45. The diameter of plate 44 is slightly larger than the diameter of plate 41 in order to provide sufficient space on the periphery of plate 44 for lock nuts 39 on the ends of U-bolts 45. Desirably, U-bolts 45 are provided with set screws 46 for contact with member 35, thus preventing rotation of member 35 in the U-bolts.

In its preferred form, elongated arm-like member 36 has a main portion 47 and two elbows separating portion 47 from end portions 48 and 49. The lowermost elbow thus defines a lower end portion 48 of the member which can thus extend beyond the rear end of the trailer chassis. The length of portion 48 can be adjusted by sliding it the requisite distance under U-bolts 45. The extension of arm-like member 36 beyond the rear end of the trailer chassis is important for guiding the bow of the boat onto the trailer before the bow actually reaches the bed of the trailer. This prevents injurious contact between the bow of the boat and the trailer chassis and permits one-man loading of the boat onto the trailer.

It is preferred that the upper portion 49 of the member 36 also be angled so as to give an overall C-shape to the member. The portions 47, 48 and 49 may be in the same plane or in different planes. The forward angling of portion 49 (to the substantially perpendicular position of FIG. 4) brings portion 49 into stabilizing contact with a gunwale of the boat and eliminates a projecting end of the member which could puncture portions of the boat or otherwise constitute a dangerous instrumentality. The terminal end member 36 may be capped with an eye, screw socket or other fixture 51 for attachment of a line or chocks on the boat or other bracket for additional stability in overland transport of the boat.

Mounted across the end of member 35 as by welding is a plate 52. Plate 52 is similar to plate 41 in that it has on the periphery thereof a pair of slots 53 for receiving bolts 54. It is different from plate 41 in that it has one or more holes 55 (for purposes to be described) and a centering pin 56 welded or otherwise affixed through its center. Centering pin 56 is loosely received in a center hole in a companion plate 57 so as to permit plate 57 to rotate on plate 52. Plate 57 is connected longitudinally of the lower portion 48 of arm-like member 36 by a pair of U-bolts 45. As with respect to the connection of plate 44 to member 35, U-bolts 45 have set screws 58 which prevent rotation of portion 48 in the U-bolts. It will be noted that the diameter of plate 52 is somewhat less than the diameter of plate 57 so as to provide space for lock nuts 39 for U-bolts 45 on the periphery of plate 57.

Plate 57 has at least two holes 59 therethrough set 90° apart to receive a lock bolt or pin therethrough and also through hole 55 in the smaller diameter plate 52. In this manner, portion 48 of arm-like member 36 may be affixed at any position of pivot relative to member 35 but usually in 90° increments, as illustrated in FIGS. 1 and 4, so that portion 48 of member 36 may be positioned horizontally for use in loading a boat (FIG. 4) or may be moved forward to a vertical position so that upper portions 47 and 49 stabilize the boat on the trailer (FIG. 1).

The length of arm-like member 36 may be adjusted in various ways, such as in accordance with the telescopic arrangement illustrated in FIGS. 11 wherein one portion of the member has a sleeve 61 fitting over the remaining portion 62, with a suitable lock bolt 63 connecting the two portions.

In operation, with reference to FIGS. 1–4, the apparatus is affixed in paired relationship or opposing sides of a trailer chassis. It will be noted that member 35 may be moved through U-bolts 45 connected to plate 44 in the direction of the arrow in FIG. 5 so as to provide the necessary clearance for member 36 along the sides of the trailer chassis relative to position of the boat on the chassis. Accordingly, boats of different widths may be accommodated. A similar adjustment in the length of member 36 may be made by moving lower portion 48 through the U-bolts 45 connected to plate 57. Arm 36 is thereby adjusted for the height of the boat to be loaded on the trailer chassis.

The pivotable connections between members 34 and 35, and members 35 and 36, permits adjustment of the apparatus for clearance between the apparatus and the underside of the boat relative to the bed of the trailer chassis, as illustrated particularly in FIGS. 3 and 4.

Once a paired set of the apparatus has been affixed to opposing sides of the trailer chassis, the member 36 is rotated rearwardly of the chassis to the position shown in FIG. 4. This position permits easy alignment of the bow of the boat so that the boat can be guided over the surface 63 of the water between the arms 36 onto the bed of the trailer, as by operation of winch 28, as the trailer chassis is maintained stationary on the ramp 64. When the boat has thus been loaded onto the trailer, the arm 36 may be rotated forward to a storage and boat stabilizing position illustrated in FIG. 1.

If desired, an auxiliary sleeve (not shown) of plastic, rubber or other cushioning material may be fitted over member 36 so as to provide some cushioning between the arms 36 and the side of the boat during the loading or unloading operation.

Should the trailer chassis be constructed primarily of a single center rail, such as represented diagrammatically by rail 24b in FIG. 5, the apparatus of the invention again may be paired to provide the advantages shown, by anchoring one member 34 above the rail 24b and the second member 34 below rail 24b. The pair of plates 41 and 44 coupling members 34 and 35, can be given sufficient clearance rearwardly of the trailer chassis so that the apparatus of the invention is operative. Accordingly, the apparatus is useful with virtually any type of boat trailer or boat which can be carried by the trailer.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In apparatus for paired attachment to opposing rear portions of a boat trailer having a chassis, for guiding a boat onto or off the trailer, the combination of:

an elongated, rigid first member adapted for attachment to the chassis of said trailer longitudinally thereof;
means for attaching said first member to said chassis, an elongated, rigid second member coupled to said first member for pivotal motion about the longitudinal axis of said first member, said second member extending generally transversely of said first member and laterally of said chassis;
an arm-like third member coupled to said second member for pivotal motion in a substantially vertical plane about the longitudinal axis of said second member, said third member extending generally transversely of said second member; and
means for locking said members at predetermined positions relative to one another.

2. Apparatus as in claim 1, including a first pair of rotatably engaged plates coupling said first and second members, and a second pair of rotatably engaged plates coupling said second and third members, wherein one of said first pair of plates is fixedly mounted across an end of said first member and one of said second pair of plates is fixedly mounted across an end of said second member.

3. Apparatus as in claim 2 wherein one of each pair of plates is slotted near the periphery thereof so as to receive bolts for locking the plates in each pair together at predetermined positions of rotation relative to one another.

4. Apparatus as in claim 2 wherein the plates mounted on said second and third members are adapted to be slidably positioned along said second and third members.

5. Apparatus as in claim 4 wherein said plates slidably mounted on said second and third members are held at predetermined positions thereon by U-bolts.

6. Apparatus as in claim 2 wherein the other plate of said first pair of plates is slidably mounted on said second member, and the other plate of said second pair of plates is slidably mounted on said third member.

7. Apparatus as in claim 2 wherein the plate mounted on said second member has at least one hole near the periphery thereof, and the plate mounted on said third member has at least two holes near the periphery thereof, said holes in said plates being positioned for passage therethrough of locking means, whereby said plates may be locked together at relative positions of rotation corresponding to the distance between said holes in the plate mounted on said member.

8. Apparatus as in claim 1, including a plurality of riser clamps for attachment of said first member to the chassis of said trailer, the riser portions of said clamps being angled such that said clamps seat on said first member at an angle of about 45°.

9. Apparatus as in claim 5 wherein said U-bolts have set screws therethrough whereby rotation of said second and third members in said U-bolts is prevented.

10. Apparatus as in claim 4 wherein said plates slidably mounted on said second and third members are held at predetermined positions thereon by U-bolts, and wherein the diameters of said plates are larger than the diameters of the plates paired therewith, so as to permit locking of the heads of said U-bolts on the peripheries of said larger diameter plates.

11. Apparatus as in claim 1 wherein said arm-like third member has at least one elbow along its length such that the portion of said member coupled to said second member is adapted to clear the rear end of said trailer chassis while the remaining portion of said third member is directed upwardly along the side of a boat on said trailer chassis.

12. Apparatus as in claim 11 wherein said arm-like third member has two of said elbows so as to give a generally C-shape to said third member.

13. A boat trailer comprising a chassis and paired apparatus as defined in claim 1, said paired apparatus being attached to opposing rear portions of said chassis for guiding a boat onto or off said chassis.

* * * * *